April 26, 1955

L. A. CUTTING ET AL 2,706,958

ROTARY HULL VEHICLE

Filed May 18, 1953

INVENTORS
LESLIE A. CUTTING
JAMES C. HORNE
BY Madsen Lothrop
ATTORNEY

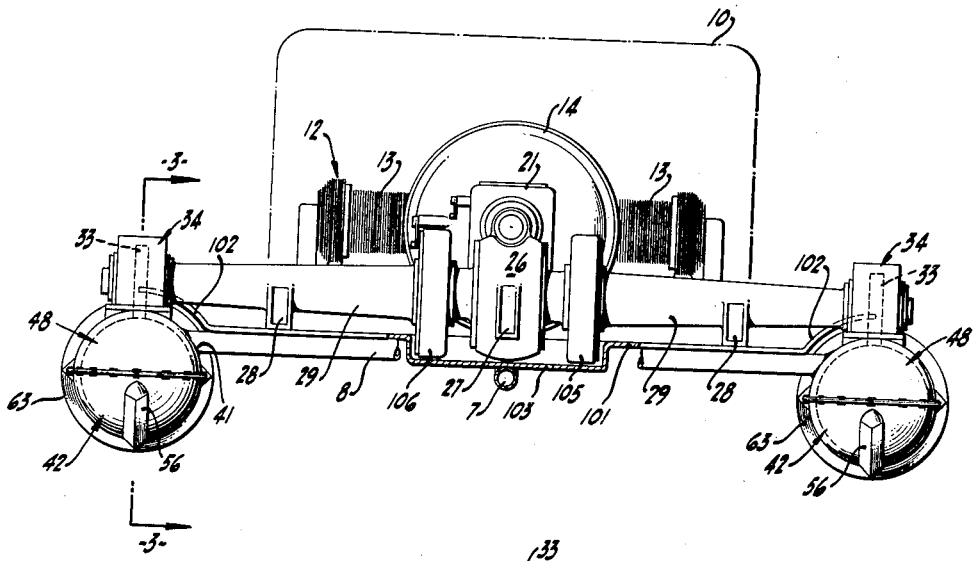

United States Patent Office 2,706,958
Patented Apr. 26, 1955

2,706,958

ROTARY HULL VEHICLE

Leslie A. Cutting, Benicia, and James C. Horne, Gardena, Calif.

Application May 18, 1953, Serial No. 355,776

4 Claims. (Cl. 115—19)

Our invention relates to machines for travelling over snow, ice, water, tundra, muskeg, etc., and especially to machines having a rotating buoyant hull in tractive engagement with a supporting medium.

Civilian and military activities are today global in scope, with particular emphasis on the polar and sub-polar regions. Transportation in these areas is difficult. Vast reaches of terrain having widely differing surface characteristics must be traversed. Roads suitable for the customary wheeled or even tracked motor vehicle are infrequent or often non-existent. Thus, depending upon the particular season of the year and the area to be covered, it is possible that a vehicle travelling cross-country in these regions may not only be required to traverse surfaces of ice and snow, but water and swamps or muskeg as well.

In addition to the problems raised by this variety of surface, vehicle maintenance and repair are rendered difficult owing to the infrequency or inadequacy of service facilities in these areas. A vehicle may at times be required to operate independently, and with perhaps only one or two persons aboard, at considerable distance from service installations, and in weather hazardous to personnel and material.

It is therefore an object of our invention to provide a self-propelled vehicle for traversing a wide variety of terrain and surface.

It is another object of the invention to provide a vehicle light yet durable and strong, and especially suitable for either scheduled maintenance or emergency repair by one or two persons using only the customary hand tools.

It is still another object of the invention to provide a vehicle for carrying passengers and cargo over territory lacking roads and bridges.

It is a further object of the invention to provide a vehicle gravitally stable in operation yet responsive quickly to requirements of speed and direction changes at the command of the operator.

A yet further object of the invention is to provide a rotary hull vehicle supportable on snow, water, muskeg, etc., yet largely avoiding the customary tendency of a hulled vehicle to rock, pitch or yaw while operating on snow, water or swampy stretches during storm conditions.

A still further object of the invention is to provide a generally improved rotary hull vehicle.

Other objects, together with the foregoing, are attained in the embodiment of our invention described in the accompanying description and illustrated in the accompanying drawings in which:

Figure 2 is a front elevation thereof.

Figure 3 is a section, to an enlarged scale, along the plane indicated by the line 3—3 of Figure 2 and having a portion of the structure broken away to reduce the extent of the figure.

Figure 4 is a section, to an enlarged scale, along a plane normal to the axis of a hull showing a modified form of our spirally wound fins and having a portion of the structure broken away to reduce the extent of the figure.

Figure 1:
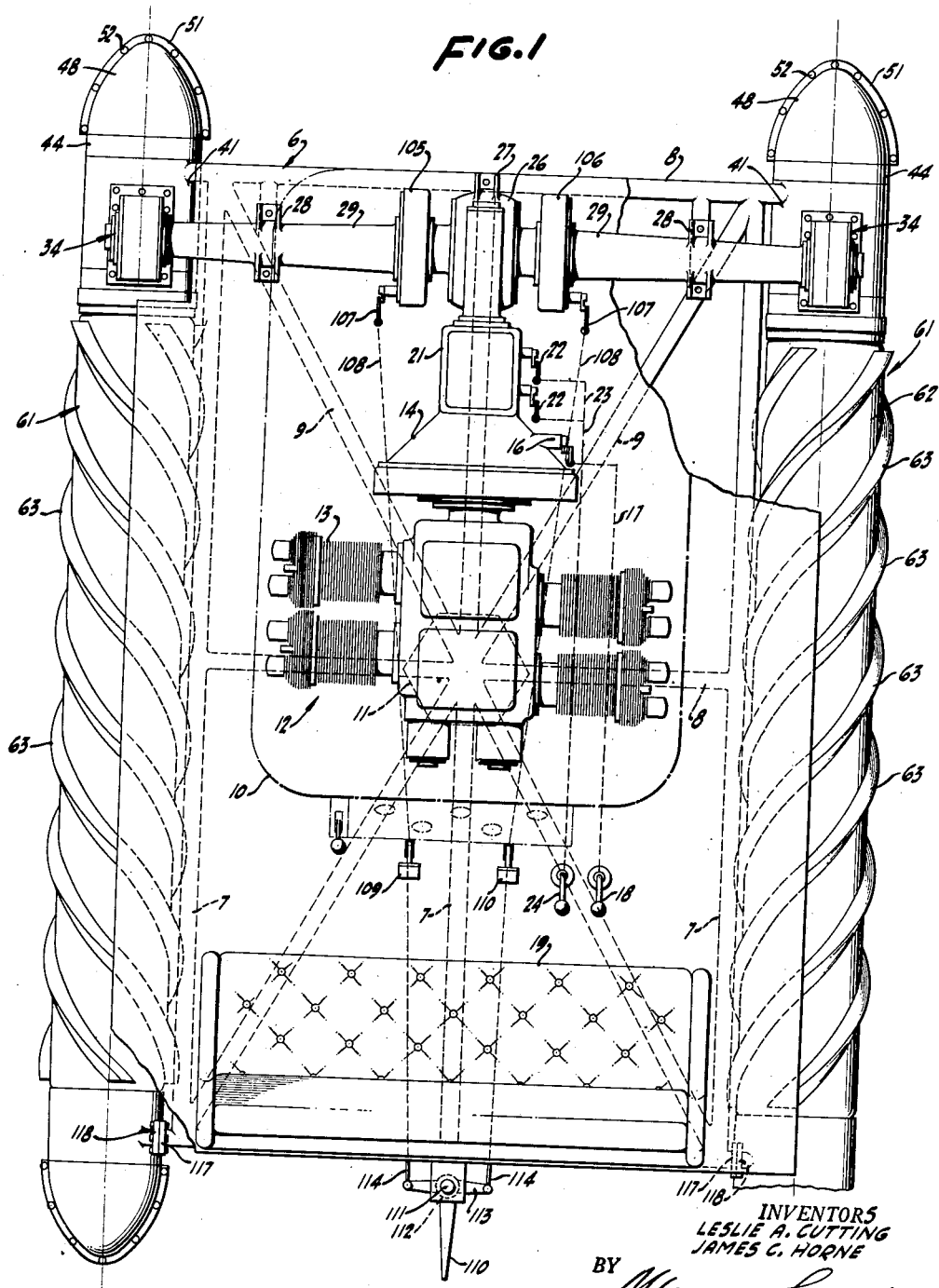
Figure 1 is a plan of a rotary hull vehicle in accordance with the invention.

In its preferred form, our vehicle includes a frame 6 preferably of welded tubular construction comprising longitudinal members 7, transverse members 8 and diagonal members 9 to form a light yet strong structure of the X or K type.

An hexagonal plate 11 secured to the center of the web formed by the intersecting frame members increases frame strength and rigidity and supports an engine 12 mounted to the plate and to the frame members by the usual brackets, flanges, etc. The engine may be of any kind but conveniently is of the internal combustion type having a plurality of cylinders 13 of the flat or pancake opposed type, and being finned for cooling by air in order to take advantage of the frequently low temperatures encountered in the regions traversed by this vehicle. Not only is a water cooling system thereby eliminated, with its attendant structure and weight, but danger to the engine from freezing of cooling water is obviated. An engine hood 10 protects the engine and other structure from the weather.

A suitable engine flywheel and clutch mechanism is disposed within a clutch housing 14 mounted on the frame ahead of the engine. Control of clutching and de-clutching is provided by an appropriate spring loaded clutch release shaft 16, pivotally connected to a rod 17 leading to a clutch lever 18 conveniently located with respect to an operator's bench 19 or seat.

Within a transmission housing 21, adjacent to and forward of the clutch housing, is confined a transmission of the customary kind, and providing, for example, three speeds forward and one reverse, by appropriate manipulation of a pair of gear shift levers 22 linked by a pair of rods 23 to an operator's manually operated lever 24 adjacent the seat 19.

Leading forwardly from the transmission is the usual propeller shaft terminating in a pinion gear in engagement with a ring gear and the customary carriers, spider and side gears comprising the differential, all disposed within a differential housing 26 mounted on the frame by a bracket 27.

The bracket 27 and a pair of outer brackets 28 secured to the frame support not only the differential housing 26 but a pair of axle housings 29 projecting outwardly from opposite sides of the differential housing. Inside each axle housing is a rotatable axle 31 extending outwardly from the differential side gear, and supported by suitable anti-friction bearings.

Mounted near the end of each axle and for rotation therewith, as by a key 32 or spline, is a worm 33 or skew gear, confined within a worm housing 34 and in engagement with a worm gear 35.

The worm housing 34 is fastened to a shaft housing 36 comprising a forward drum 37 and a rearward drum 38 joined by a sleeve 39. The forward drum is fastened to the frame member 8 as by welding 41 or by bolting.

In order to reduce frictional resistance caused by the wind, snow and water, we provide a streamlined cover generally designated 42 adjacent the forward drum 37. Welded around the leading edge of the forward drum 37 is a lower cap 43, comprising a cylindrical sleeve portion 44, an ogive or semi-parabola portion 46 and a flanged portion 47. A top cap 48 comprises an ogive portion 49 and a flanged portion 51 fastened to the adjacent flange 47 by bolts 52. By removing the bolts 52 and lifting the top cap 48, access can be had to a covered compartment 53 for repair and maintenance.

Fastened along the bottom of the shaft housing 36 and curved upwardly to conform to the streamlined cover 42 is a sturdy runner 56 for guiding the vehicle, and as a support therefor when traversing ice or other hard surfaces. The runner is formed conveniently of angle bar and terminates on its forward edge in a solid body 57 of metal acting as a buffer or bumper.

For the purpose of supporting, propelling and steering the vehicle we provide on opposite sides of the frame a pair of hulls 61 or pontoons. Since the hulls on each side are substantially identical in construction a description of one will serve equally to describe the other. The hull 61 comprises a circular cylindrical body 62 having mounted on the exterior surface thereof spirally wound fins 63 fabricated of angle bar. The pitch of the helical fins or threads may be varied to suit the particular operational environment of the vehicle but in order to increase the speed of the vehicle we prefer to furnish double or even quadruple threads 63 as are shown most clearly in Figure 1.

Since the hull must be water-tight in order to buoy or support the vehicle in water or comparable media, means are provided for capping the ends of the hull body 62. At each end of the hull we provide a collar 64 welded to the hull periphery as at 66. We also provide an interior brace 67 or collar. Fastened between the collars 64 and 67 is a tapered sleeve 68. The tapered sleeve 68 is concentric about a longitudinal axis 69 serving also as a longitudinal rotational axis of the hull.

In order to support the hull for rotation, to connect the hull with the shaft housing and the frame structure and to prevent entry of snow or water through the sleeve 68 into the hull interior, we provide a shaft generally designated 71, having a tapered portion 72 conforming in contour to the taper of the hull sleeve 68, a threaded portion 73, journal portions 74 and 75, a keyed portion 76 and a cap thread portion 77.

In mounting the hull, the shaft tapered portion 72 is inserted into the sleeve 68. Since the sleve 68 is centered with respect to the hull, no special problem of centering the shaft arises since tight engagement between the tapered shaft and the similarly tapered sleeve assures centering. To obtain such tight engagement we provide a flange 81 having a central bored opening 82 therein and tapped for threaded engagement with the shaft threaded portion 73. The flange 81 is screwed on the threaded portion 73 of the shaft until the flange is adjacent the hull collar 64. When a first set of drilled openings 83 in the flange 81 are in registry with corresponding drilled and tapped openings 84, slightly smaller in diameter than the openings 83, in the collar 64, cap screws 86 can be inserted through the respective flange and collar openings, and by taking up on the cap screws the collar 64 and the flange 83 are forced toward each other, and the sleeve 68 and the tapered shaft brought into tight engagement. Thus, the hull and shaft are not only concentrically positioned but are secured to each other by the cap screws and by frictional contact of the sleeve and the shaft.

A first anti-friction bearing 87 can then conveniently be pressed on the shaft journal portion 74. The hull structure, including the shaft centered therein and fastened to rotate therewith, may then be installed in the position shown in Figure 3. As the shaft is inserted, the worm gear 35 is mounted, as by keying, to the keyed portion 76 of the shaft. A second anti-friction bearing 88 is then pressed on the bearing portion 75 of the shaft, with the bearing 88 outer race being confined by a flange 89 bolted to the forward drum 37. A cap nut 91 is threaded onto the shaft portion 77 serving to confine the inner race of the bearing and securing the shaft and hull against translation.

Figure 3 illustrates the front or hull-driving shaft construction in the particular embodiment shown. The opposite or rear end of the hull is similarly constructed and mounted in a shaft housing, the rear mounting differing from the structure shown in Figure 3 in that no driving mechanism or gears are included in the rear structure. That is to say, the rear structure is similar except that it does not include the gear housing 34, nor the enclosed worm 33 and worm gear 35.

In normal propulsion of the vehicle, the inter-meshing teeth of the worm 33 and gear 35 are so shaped that while the axles rotate in the same direction, the oppositely disposed worm gears 35, shafts and spirally finned hulls are rotated in opposite directions; and in the embodiment shown in Figure 2, and assuming motion of the vehicle toward the viewer, the left hand hull rotates counterclockwise and the right hand hull, clockwise.

As a platform for cargo and crew, and to prevent snow, water or other media from being thrown or splashed onto the cargo and crew, we provide a pan 101 mounted on the frame and having on opposite sides a splash guard 102 contoured upwardly and around a portion of the hulls. Since the machine and the differential housing are placed as low as possible on the vehicle, for the purpose of increasing stability, a central portion of the pan 101 is formed to create a sump 103 to accommodate the lowered structure and to receive and collect miscellaneous unwanted matter such as water, oil, grease, etc.

The spirally finned hulls are water-tight and have an interior volume of air or other gas sufficient to buoy up or support the vehicle so that when the vehicle is snow or water borne, the snow or water level is substantially below the pan 101 or platform. Since the hulls are separated or spaced apart, the distance between the center of gravity of the vehicle and the center of buoyancy of either of the hulls is large in comparison with the righting moment of a single hulled vessel and, accordingly, the double hulled vehicle is more stable or has less tendency to rock than a single hulled vessel when supported by the same medium.

Owing to the length of each hull in comparison with its width, and owing to the fact that there are two longitudinally extended and spaced hulls the tendency present in most single hulled vessels to pitch and yaw is substantially reduced.

The spiralled fins, rotating in opposite directions, further increase the steadiness of this type of vehicle and also lend themselves to an efficient method of steering the vehicle. With reference to Figure 1 and assuming that the vehicle is travelling forwardly, or toward the top of the drawing, the operator has available to him responsive and efficient steering means. On each side of the differential housing 26 is mounted a left hand brake housing 105 and a right hand brake housing 106 containing brake drums and attendant braking mechanism of the usual kind. The brakes are independently operable by brake levers 107 and rods 108 leading to corresponding brake pedals 109 and 110 conveniently mounted for foot pressure operation adjacent the seat 19.

Since each axle is driven independently of the other by the differential spider, a braking effort exerted on one of the rotating axles will not slow the rotation of both axles but rather, owing to the differential construction, is effective to speed up the rotational velocity of the other or unbraked axle. If, therefore, the operator should wish to turn the vehicle to the left, for example, he may, by depressing the pedal 109, exert a braking effect upon the left hand axle, slowing down or stopping the rotation of the left hand hull. Concurrently, owing to the differential construction, the rotation of the right hand axle and right hand hull will be speeded up. As a result of the different speeds of rotation as between the two hulls, a turning effort or turning moment is obtained and the vehicle is turned toward the left. When travelling in reverse gear, this method of brake-steering is equally effective.

For use especially in water or snow, and for turns of large radius, we also provide a rudder 110 pivotally mounted by means of the customary pintle 111 and gudgeon 112 and having a yoke 113 mounted transversely on the rudder and connected, as by a cable 114, to cooperating structure associated with the brake-steering pedals 109 and 110, or to the customary tiller or steering wheel, if preferred.

In order to facilitate maintenance and repair, we provide means for removing either or both of the hulls from the corresponding shafts, such means being especially suitable for use by one or two persons using only the customary hand tools carried on a vehicle of this type. Should, for example, the hull 61, shown especially in Figures 1 and 3, need to be removed from the shaft housing 36 and separated from the shaft 71, it is necessary only that the operator back off on the cap screws 86 until the screws are no longer in engagement with the openings 84 in the collar 64, using an open end wrench, for example, inserted through access holes or openings in a weather protective sleeve 116 mounted on the shaft housing, and withdraw the screws from the holes 83 in the flange 81. A pad 117 on the outer end of the rear transverse frame member 8 is unbolted from a corresponding pad 118 mounted on the rear shaft housing, disconnecting the rear housing from the frame so as to permit rearward motion of the hull. Rearward motion of the hull, and separation of the hull sleeve from the driving shaft is effected by inserting the cap screws 86 into a second set of openings 121 drilled and tapped in the flange 81 and located between and spaced from the first set of drilled but untapped flange openings 83. The second set of openings 121 are not in registry with the openings 84 in the collar; and thus by setting up on the cap screws 86, the cap screws exert a force against the collar 64 tending to separate the collar from the flange. Separation of collar from flange effects a corresponding separation and disengagement between the tapered portion of the shaft and the tapered sleeve. One or two persons with simple hand tools are thereby enabled to separate shaft and hull.

When maintenance of or repair to the hull has been effected, the hull sleeve can again be inserted over the tapered shaft, the flange 81 turned until the corresponding tapped openings in the collar and untapped openings in the flange are again in registry and the cap screws taken up in order to center the shaft and sleeve and to accomplish re-engagement between the hull and the shaft.

Should a bearing puller be unavailable, and should it be desired to remove not only the hull, but the shaft, as well, from the shaft housing, the translational force exertable by the cap screws 86 in the flange 81 may again be utilized. By removing the streamlined top cap 48, removing the cap nut 91 and backing off on the cap screws 86 threaded in the second set of openings 121 (tapped flanged openings) until the caps abut the disk portion of the drum 38, and by continuing thereafter to back off on the screws, the flange and shaft are forced to translate away from the fixed drum disk, and the shaft is pulled from its bearings.

Under some circumstances of operation it is desirable to utilize a modification of the fins 63 fabricated of angle bar. We therefore provide a spirally wound channel 121 comprising a pair of legs 122 or flanges, welded to the hull body 62, and a plate 123 presenting a superficial area for supporting the vehicle in hard packed snow and slush. As a supporting and tractive member, especially useful on ice or other solid or semi-solid medium we also provide a hardened steel runner 126 spirally wound and welded to the plate 123. In order more securely to confine the runner 126 to the plate 123, a plurality of tabs 127 are punched upwardly from the plate at appropriate spaced locations and over-bent to permit placement of the runner 126 on the plate. The tabs 127 are then bent downwardly to confine the runner 126 as is shown in Figure 4, and may conveniently be welded thereto.

What is claimed is:

1. In a rotary hull vehicle; a frame; a prime mover mounted on said frame; a circular cylindrical buoyant hull journaled on said frame and rotatable by said prime mover for tractive engagement with a supporting medium; a tapered sleeve mounted coaxially with said hull at one end of said hull; a collar encompassing said sleeve and capping said hull, there being a plurality of tapped openings in said collar; a shaft having a first portion tapered for engagement with said sleeve, a second portion being threaded and a third portion contoured to receive anti-friction bearings; a flange centrally bored and tapped for threaded engagement with said threaded shaft portion and having a first set of openings for registry with corresponding of said tapped openings in said collar, and a second set of openings, said second set being tapped and being spaced from said first set of openings; a plurality of cap screws being, in a first position, situate within said first set of flange openings and in threaded engagement with said collar openings for clamping together said shaft and said sleeve, and in a second position being in threaded engagement with said second set of openings and in abutment with said collar for dislodging said shaft from said sleeve; and anti-friction bearings mounted on said shaft for rotation thereof about a fixed axis.

2. A rotary hull vehicle comprising a longitudinally extended frame, an engine mounted on said frame as a power source, a pair of gear drive housings secured to opposite sides of one end of said frame, a tapered shaft journaled in each of said housings and projecting toward the other end of said frame for rotation about an axis parallel to the longitudinal axis of said frame, a gear wheel keyed to said shaft, a worm gear in engagement with said gear wheel, means connecting said engine to said worm gear for transmitting power thereto for rotation of said gear wheel and said shaft, a flange threaded on said shaft, a buoyant hull for supporting and propelling said frame, said hull including a hollow circular cylindrical body, a tapered sleeve mounted at one end of said body and coaxially therewith, a collar encircling said sleeve and secured to said body, means connecting said flange and said collar for translating said shaft into a first position in engagement with said sleeve and into a second position of disengagement therewith, a pair of housings secured to opposite sides of the other end of said frame, and a tapered shaft journaled in each of said housings and projecting toward said one end of said frame for engagement with a corresponding one of said sleeves at the adjacent end of said buoyant hull.

3. A rotary hull vehicle comprising a frame; an engine mounted on said frame; a pair of axle housings extending transversely of said frame at the front end thereof; and duplicate supporting structures arranged longitudinally along the sides of said frame, each of said structures including a worm gear at the outer end of one of said axle housings, means for transmitting power from said engine to said worm gear, a worm housing at the end of said axle housing enclosing said worm gear, a stationary cylindrical forward housing joined to said worm housing and extending forwardly of said frame, a shaft extending from said forward housing to the rear thereof, a pair of bearings in said forward housing for journalling said shaft therein for rotation about an axis parallel to the longitudinal axis of said frame, a gear wheel keyed to said shaft between said bearings and in engagement with said worm wheel, a buoyant hull for supporting and propelling said frame, said hull including a hollow cylindrical body constituting substantially a rearward continuation of said forward housing, a sleeve secured to said hull and engaging the extended part of said shaft, a flange on said shaft, means detachably connecting said flange and said hull to hold said sleeve in engagement with said shaft, a stationary cylindrical rearward housing secured to said frame, means for rotatably supporting said hull in said rearward housing, and spirally wound fins secured to the outer surface of said hull.

4. A rotary hull vehicle comprising a frame; an engine mounted on said frame; a pair of axle housings extending transversely of said frame at the front end thereof; and duplicate supporting structures arranged longitudinally along the sides of said frame, each of said structures including a worm gear at the outer end of one of said axle housings, means for transmitting power from said engine to said worm gear, a worm housing at the end of said axle housing enclosing said worm gear, a stationary cylindrical forward housing joined to said worm housing and extending forwardly of said frame, a shaft extending from said forward housing to the rear thereof, a pair of bearings in said forward housing for journalling said shaft therein for rotation about an axis parallel to the longitudinal axis of said frame, a gear wheel keyed to said shaft between said bearings and in engagement with said worm wheel, a buoyant hull for supporting and propelling said frame, said hull including a hollow cylindrical body constituting substantially a rearward continuation of said forward housing, a sleeve secured to said hull and engaging the extended part of said shaft, a flange on said shaft, means detachably connecting said flange and said hull to hold said sleeve in engagement with said shaft, a stationary cylindrical rearward housing secured to said frame, means for rotatably supporting said hull in said rearward housing, and spirally wound fins secured to the outer surface of said hull, each of said fins having a contour in transverse cross section including a flat plate portion and a runner projecting centrally therefrom.

References Cited in the file of this patent

UNITED STATES PATENTS

| | | |
|---|---|---|
| 1,133,193 | Stirn | Mar. 23, 1915 |
| 1,194,269 | Best | Aug. 8, 1916 |

FOREIGN PATENTS

| | | |
|---|---|---|
| 422,597 | Italy | June 20, 1947 |
| 617,421 | France | Nov. 20, 1926 |